United States Patent
Koizumi et al.

(10) Patent No.: US 8,177,962 B2
(45) Date of Patent: May 15, 2012

(54) METAL CORROSION INHIBITOR AND HYDROGEN CHLORIDE FORMATION INHIBITOR IN A CRUDE OIL ATMOSPHERIC DISTILLATION UNIT

(75) Inventors: Masakazu Koizumi, Tokyo (JP); Tsuyoshi Hagiwara, Tokyo (JP); Koichi Tanaka, Tokyo (JP)

(73) Assignee: Kurita Water Industries, Ltd., Tokyo (JP)

( * ) Notice: Subject to any disclaimer, the term of this patent is extended or adjusted under 35 U.S.C. 154(b) by 708 days.

(21) Appl. No.: 10/533,910

(22) PCT Filed: Nov. 12, 2003

(86) PCT No.: PCT/JP03/14392
§ 371 (c)(1),
(2), (4) Date: May 5, 2005

(87) PCT Pub. No.: WO2004/044266
PCT Pub. Date: May 27, 2004

(65) Prior Publication Data
US 2006/0043340 A1     Mar. 2, 2006

(30) Foreign Application Priority Data

Nov. 12, 2002    (JP) .................. 2002-328857
Jan. 28, 2003    (JP) .................. 2003-018630

(51) Int. Cl.
*C23F 11/00*     (2006.01)
*C23F 11/10*     (2006.01)
*C09K 3/00*     (2006.01)
*C10G 7/10*     (2006.01)

(52) U.S. Cl. ............ 208/47; 252/387; 252/392; 585/950

(58) Field of Classification Search .................. 208/47, 208/184
See application file for complete search history.

(56) References Cited

U.S. PATENT DOCUMENTS
2,402,793 A    6/1946   White et al.
(Continued)

FOREIGN PATENT DOCUMENTS
EP     0 463 423     1/1992
(Continued)

OTHER PUBLICATIONS
International Search Report dated Oct. 19, 2007 in corresponding European Patent Application No. 03772720.3.
(Continued)

*Primary Examiner* — Peter F Godenschwager
(74) *Attorney, Agent, or Firm* — Posz Law Group, PLC

(57) ABSTRACT

The quaternary ammonium compound described by general formula 1 below

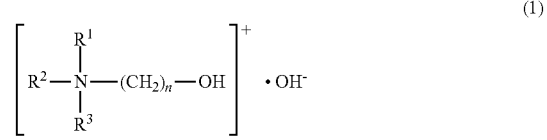

(wherein $R^1$, $R^2$ and $R^3$ are the same or different hydrocarbon radicals with 1 to 4 carbon atoms, and n is an integer between 1 and 10) is used as a metal corrosion inhibitor. With this metal corrosion inhibitor, it is possible even with the addition of small quantities to adequately prevent corrosion of metal in a steam generating unit or petroleum refining or petrochemical process unit.

Moreover, (β-hydroxyethyl)trimethylammonium hydroxide is used as a hydrogen chloride formation inhibitor for a crude oil atmospheric distillation unit. With this hydrogen chloride formation inhibitor, it is possible to prevent the formation of hydrogen chloride itself in a crude oil atmospheric distillation unit without having any adverse effect on the catalyst.

5 Claims, 3 Drawing Sheets

U.S. PATENT DOCUMENTS

| | | | |
|---|---|---|---|
| 4,600,518 A | 7/1986 | Ries et al. | |
| 5,026,523 A * | 6/1991 | Taya | 422/16 |
| 5,302,253 A * | 4/1994 | Lessard et al. | 196/132 |
| 5,965,785 A * | 10/1999 | Braden et al. | 208/47 |
| 6,173,776 B1 * | 1/2001 | Furman et al. | 166/279 |
| 7,279,089 B2 * | 10/2007 | Vercammen | 208/48 AA |

FOREIGN PATENT DOCUMENTS

| | | |
|---|---|---|
| EP | 0 730 018 | 9/1996 |
| EP | 1 298 185 | 4/2003 |
| JP | A-60-243186 | 12/1985 |
| JP | A-62-281332 | 12/1987 |
| JP | A-03-291390 | 12/1991 |
| JP | 2002129366 A * | 5/2002 |
| WO | WO 97/12947 | 4/1997 |

OTHER PUBLICATIONS

International Search Report dated Nov. 12, 2002 in corresponding Japanese Patent Application No. PCT/JP03/14392.

* cited by examiner

METAL CORROSION INHIBITOR AND HYDROGEN CHLORIDE FORMATION INHIBITOR IN A CRUDE OIL ATMOSPHERIC DISTILLATION UNIT

BACKGROUND OF THE INVENTION

1. Field of the Invention

The present invention relates to a metal corrosion inhibitor for preventing corrosion of metal in a steam generating unit such as a boiler, steam generator or the like, or in a petroleum refining or petrochemical process unit, and to a method for preventing corrosion of metal in a steam generating unit or petroleum refining or petrochemical process unit, and relates in particular to a metal corrosion inhibitor and method for preventing corrosion of metal which can prevent corrosion even when small quantities of the metal corrosion inhibitor are added. Moreover, the present invention relates to a hydrogen chloride formation inhibitor and method for inhibiting formation of hydrogen chloride which can prevent metal corrosion caused by hydrogen chloride gas in a crude oil atmospheric distillation unit.

2. Description of the Related Art

In order to prevent corrosion of metal in equipment such as various types of boilers, the waste heat boilers of petrochemical plants, gas turbine facilities and the like, and the steam generators of pressurized water reactors, it is necessary to control the pH appropriately at various points (the feed water system, the boiler, the vapor/condensed water system.) For example, in a boiler wherein softened water or raw water is feeded, carbonic acid is produced when carbonates and hydrogen carbonates contained in the feed water decompose in the boiler water. The resulting carbonic acid lowers the pH primarily in the vapor/condensed water system, and this causes corrosion.

Moreover, the steam generation unit of a process system may become contaminated with acid components including inorganic acid and organic acid derived from the process. Such acid components lower the pH at various points and cause corrosion.

Such corrosion can be prevented by neutralizing the acid components with a pH controller to obtain an appropriate pH.

Thus, ammonia and neutralizing amines are ordinarily used as pH controllers in feed water systems and vapor/condensed water systems. Examples of neutralizing amines include alkanolamines, cyclohexylamine, morpholine and the like.

Corrosion prevention in the boiler is normally achieved by controlling the pH using boiler compounds containing sodium hydroxide, sodium phosphate or the like, but when volatile treatments are also being processed in the boiler, ammonia and neutralizing amines are used as pH controllers. As above, possible neutralizing amines include alkanolamines, cyclohexylamine, morpholine and the like (see Japanese Patent Application Laid-open No. S61-34095, page 2, upper left column, lines 1-3).

In the fields of petroleum refining process and petrochemical process, hydrogen chloride, hydrogen sulfide, carbon dioxide and other acid components contained in the crude oil can dissolve in water (condensed water, free water, etc.) generated within or at the top of a distillation column or fractionating column or the like, and cause corrosion of the metal of the unit.

For example, in the atmospheric distillation process of petroleum refining, the crude oil is ordinarily first desalted in the desalter, then heated to a prescribed temperature in the heating furnace and feeded to the atmospheric distillation column (main distillation column), where it is separated into naphtha fraction, kerosene, gas oil component, residue and the like. In this atmospheric distillation process, the magnesium chloride and calcium chloride in the crude oil produce hydrogen chloride gas by hydrolysis, as shown by the following reaction formula.

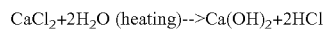

$$CaCl_2 + 2H_2O \text{ (heating)} \rightarrow Ca(OH)_2 + 2HCl$$

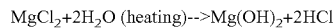

$$MgCl_2 + 2H_2O \text{ (heating)} \rightarrow Mg(OH)_2 + 2HCl$$

The hydrogen chloride gas produced in this way dissolves in condensed water produced in the low temperature area of the top of the column, the overhead system or the like of the atmospheric distillation column to form hydrochloric acid, leading to unpreferable results including acid corrosion of the metal of the unit.

It is also necessary in the fields of petroleum refining and petrochemical process to control the pH in order to prevent corrosion of metal of the unit by acid components, and in general ammonia and neutralizing amines are used as pH controllers. Examples of neutralizing amines include alkanolamines, methoxypropylamine and the like (see Japanese Patent Application Laid-open No. H10-251639, page 2, left column, lines 12-24 and right column, lines 29-37).

In the atmospheric distillation process of petroleum refining, efforts are also made to prevent formation of the hydrogen chloride gas itself which is the cause of metal corrosion, with the following technologies being employed.

(1) A method of preventing formation of hydrogen chloride by adding sodium hydroxide to the crude oil at the desalter outlet in order to convert the magnesium chloride and calcium chloride in the crude oil to stable (not hydrolyzing even when heated) sodium chloride.

(2) A method of neutralize the generated hydrogen chloride in the form of amine salts by adding alkanolamines to the crude oil at the desalter outlet (Japanese Patent Application Laid-open No. H3-101801, claims).

However, the ammonia and neutralizing amines used as pH controllers as described above were only weakly neutralizing, and had to be added in large quantities. Such problems were particularly obvious when trying to prevent corrosion inside a boiler if volatile treatment was being processed.

When used as pH controllers, moreover, ammonia and neutralizing amines produce acid components and salts during the neutralization process, and since ammonia and neutralizing amines are only weakly neutralizing, the resulting neutralized salts (amine hydrochlorides, amine carbonates and the like) and neutralized salts of strong acids in particular (such as amine hydrochlorides) can dramatically lower the pH when they dissolve in water, thus causing secondary corrosion.

On the other hand, in the above method (1) as a technology for inhibiting formation of hydrogen chloride, if too much sodium hydroxide was added, the sodium deteriorated catalysts in the heavy oil direct desulfurization unit at the subsequent stage. So it was necessary to limit the amount of sodium hydroxide added even if the crude oil at the desalter outlet had a high salt concentration. As the result, the inhibitory effect on formation of hydrogen chloride was not satisfactory. In fact, when a crude oil refining unit was being operated continuously for two years or more, catalyst in the heavy oil direct desulfurization unit which had deteriorated due mainly to sodium from the sodium chloride had to be changed once a year.

In the above method (2), if the operating temperature of the top of the atmospheric distillation column was lower than the melting point of the amine hydrochlorides produced by neutralization, the amine hydrochlorides accumulated within the atmospheric distillation column, causing problems such as corrosion, line blockage or the like within the unit. Moreover, when the amine hydrochlorides produced by neutralization were heated by the furnace of the atmospheric distillation column, they became partially hydrolyzed, again producing hydrogen chloride. So neutralization by adding amines again to the top of the column was needed.

SUMMARY OF THE INVENTION

With the foregoing in view, it is an object of the present invention to provide a metal corrosion inhibitor and method for preventing corrosion of metal capable of adequately preventing corrosion even when small quantities of the metal corrosion inhibitor are added, and capable of reducing the risk of secondary corrosion caused by generated neutralized salts. Moreover, it is an object of the present invention to provide a hydrogen chloride formation inhibitor and method for inhibiting formation of hydrogen chloride capable of preventing formation of the hydrogen chloride itself rather than neutralizing hydrogen chloride produced in a crude oil atmospheric distillation unit, without any deterioration of the catalyst.

In order to achieve the objects, the present invention first provides a metal corrosion inhibitor for preventing corrosion of metal in a steam generating unit or petroleum refining or petrochemical process unit comprising a quaternary ammonium compound described by general formula [1] below:

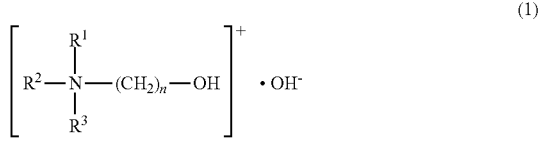

(wherein $R^1$, $R^2$ and $R^3$ are the same or different hydrocarbon radicals with 1 to 4 carbon atoms, and n is an integer between 1 and 10) (Invention 1).

In the present invention, "steam generating unit" signifies a unit capable of generating steam, and the metal composing such unit may undergo corrosion. "Petroleum refining or petrochemical process unit" signifies a unit used in petroleum refining process or petrochemical process, and the metal composing such unit may undergo corrosion, with no limits on the type of process in petroleum refining or petrochemical process.

In the metal corrosion inhibitor according to the invention (Invention 1) above, it is preferable that $R^1$, $R^2$ and $R^3$ in the general formula [1] be the same or different hydrocarbon radicals with 1-3 carbon atoms, and that n be an integer between 1 and 4 (Invention 2), and it is particularly preferable that the quaternary ammonium compound described by general formula [1] above be (β-hydroxyethyl)trimethylammonium hydroxide (Invention 3). It is also preferable that the quaternary ammonium compound described by general formula [1] above be contained in the amount of 1% by mass or more (Invention 4).

Second, the present invention provides a method for preventing corrosion of metal in a steam generating unit, wherein the quaternary ammonium compound described by general formula [1] below:

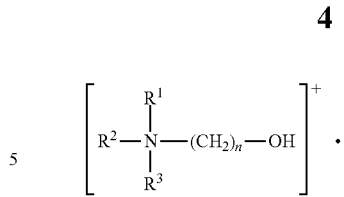

(wherein $R^1$, $R^2$ and $R^3$ are the same or different hydrocarbon radicals with 1 to 4 carbon atoms, and n is an integer between 1 and 10) is contained in water which may contact the inside of the steam generating unit (Invention 5).

In the aforementioned method for preventing corrosion of metal (Invention 5), it is preferable that the quaternary ammonium compound described by general formula [1] above be added in the range of 0.1-50 mg/L to feed water which may contact the inside of the steam generating unit (Invention 6).

Third, the present invention provides a method for preventing corrosion of metal in a petroleum refining or petrochemical process unit, wherein the quaternary ammonium compound described by general formula [1] below:

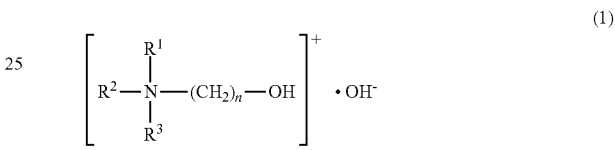

(wherein $R^1$, $R^2$ and $R^3$ are the same or different hydrocarbon radicals with 1 to 4 carbon atoms, and n is an integer between 1 and 10) is contained in fluid which may contact the inside of the petroleum refining or petrochemical process unit (Invention 7).

Fourth, the present invention provides a method for preventing corrosion of metal in an atmospheric distillation column for petroleum refining process, wherein a quaternary ammonium compound described by General Formula [1] below:

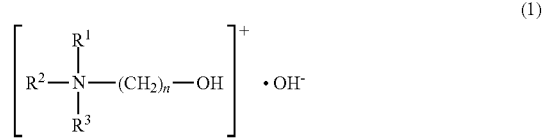

(in which $R^1$, $R^2$ and $R^3$ are the same or different hydrocarbon radicals with 1 to 4 carbon atoms, and n is an integer between 1 and 10) is contained in fluid which may contact the inside of the atmospheric distillation column for petroleum refining process such that a pH value thereof at the top line of the atmospheric distillation column is 5.5-6.5 (Invention 8).

Regarding the above invention 1 to 8, because the quaternary ammonium compound described by general formula [1] below:

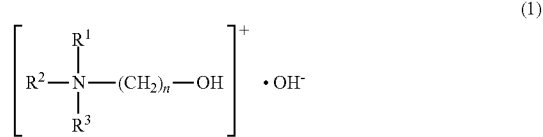

(wherein $R^1$, $R^2$ and $R^3$ are the same or different hydrocarbon radicals with 1 to 4 carbon atoms, and n is an integer between 1 and 10) (sometimes referred to hereunder as "quaternary ammonium compound A) has a higher degree of dissociation than the ammonia and neutralizing amines conventionally used as pH controllers, its capability to raise pH in water is high (its basic is strong). Moreover, because quaternary ammonium compound A has relatively low volatility, it is likely to remain in the system to which quaternary ammonium compound A was added. Consequently, with quaternary ammonium compound A it is possible to effectively prevent corrosion of metal even if only a small quantity is added.

In addition, because quaternary ammonium compound A is strongly basic, neutralized salts formed by quaternary ammonium compound A with acids can maintain a higher pH than conventional amine salts even when dissolved in water. Consequently, not only does quaternary ammonium compound A only need to be added in small quantities, but it greatly reduces the risk of secondary corrosion caused by neutralized salts.

Fifth, the present invention provides a hydrogen chloride formation inhibitor for a crude oil atmospheric distillation unit, comprising (β-hydroxyethyl)trimethylammonium hydroxide (Invention 9).

In the aforementioned hydrogen chloride formation inhibitor (Invention 9), it is preferable that (β-hydroxyethyl)trimethylammonium hydroxide be contained in an amount of 5% by mass or more (Invention 10).

Sixth, the present invention provides a method for inhibiting formation of hydrogen chloride in a crude oil atmospheric distillation unit, wherein (β-hydroxyethyl)trimethylammonium hydroxide is contained in the desalted crude oil in between the crude oil desaltor and the main distillation column in the crude oil atmospheric distillation unit (Invention 11).

In the present invention "crude oil atmospheric distillation unit" signifies a unit involved in atmospheric distillation in crude oil refining process, and includes a crude oil desaltor, a pre-distillation column if such exists, a furnace, a main distillation column (atmospheric distillation column), a heat exchanger, a condenser, a receiving tank and any associated piping and the like.

Because (β-hydroxyethyl)trimethylammonium hydroxide (also known as choline) has a high degree of dissociation and is strongly basic, the magnesium chloride and calcium chloride which cause hydrogen chloride formation can be easily converted to hydrochlorides of (β-hydroxyethyl)trimethylammonium hydroxide (choline chlorides).

That is, by using choline in the crude oil atmospheric distillation unit, it is possible to prevent the formation of the hydrogen chloride itself, thus preventing corrosion of the metal of the unit due to hydrogen chloride. Because the choline used here does not contain any metals which might adversely affect catalyst in the heavy oil direct desulfurization unit or the like, the choline will not lead to deterioration of the catalyst even if added in excess.

The choline chlorides produced in this way will be decomposed by heat in the furnace, but the main decomposition products will be methyl chloride and amines such as trimethylamine and N,N-dimethylaminoethanol, with almost no hydrogen chloride produced. Moreover, because the choline chloride is more fluid than the hydrochlorides of alkanolamines ordinarily used as neutralizers, and its metal corrosiveness is extremely low, it will not cause corrosion of the metal of the unit or line blockage.

In the aforementioned method for inhibiting formation of hydrogen chloride (Invention 11), it is preferable that the (β-hydroxyethyl)trimethylammonium hydroxide content be controlled to 0.1-5 times by molar equivalent the salts content in the desalted crude oil (Invention 12). With the choline content controlled in this way, sources of hydrogen chloride formation such as magnesium chloride and calcium chloride can be easily converted efficiently and economically to choline chloride. However, even if choline is contained in excess, problems hardly arise.

In the aforementioned method for inhibiting formation of hydrogen chloride (Inventions 11 & 12), it is preferable that the chloride ion concentration or pH of condensed water (for example overhead receiver water) in the main distillation unit be measured, and the (β-hydroxyethyl)trimethylammonium hydroxide content be controlled based on the measurement results (Invention 13). It is easy to measure the chloride ion concentration or pH of condensed water in the main distillation unit, and by using such measurement results it is possible to control a suitable choline content even when there are fluctuations in the salt content of the desalted crude oil.

In the aforementioned method for inhibiting formation of hydrogen chloride (Inventions 11-13), it is preferable that the (β-hydroxyethyl)trimethylammonium hydroxide content be controlled such that the chloride ion concentration (sodium chloride conversion) of the overhead receiver water is 0-30 mg/L or the pH of the overhead receiver water is 5.5-7.0 (Invention 14).

DESCRIPTION OF THE PREFERRED EMBODIMENTS

Figure 1:
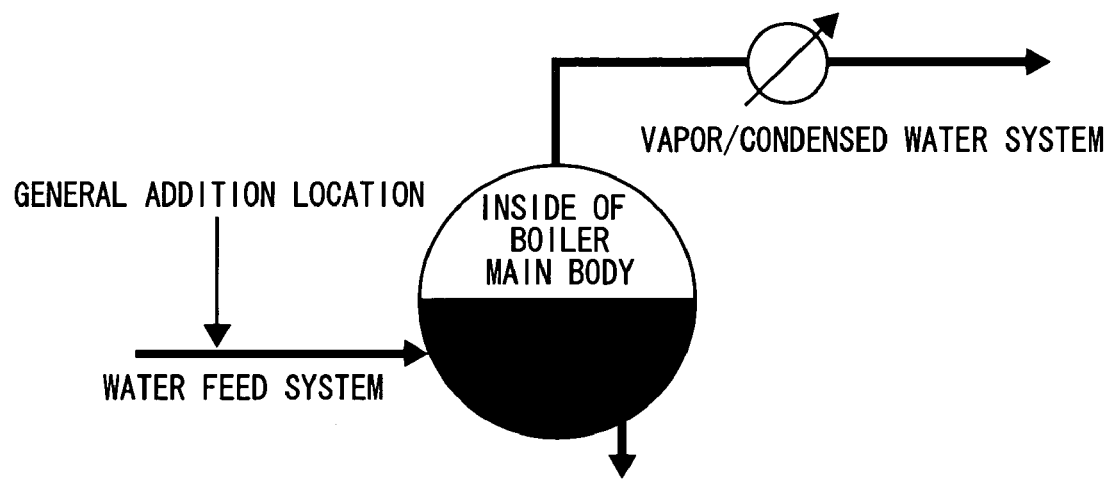
FIG. 1 is a schematic diagram of one example of a boiler.

Embodiments of the present invention are explained below.
[Metal Corrosion Inhibitor]

The metal corrosion inhibitor of the present invention contains the quaternary ammonium compound (quaternary ammonium compound A) described by general formula [1] below:

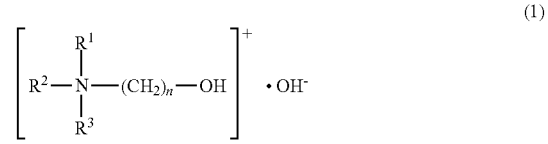

(1)

(wherein $R^1$, $R^2$ and $R^3$ are the same or different hydrocarbon radicals with 1 to 4 carbon atoms, and n is an integer between 1 and 10.)

Examples of the hydrocarbon radicals with 1 to 4 carbon atoms in general formula [1] include methyl, ethyl, n-propyl, isopropyl, n-butyl, isobutyl, sec-butyl, t-butyl and other straight-chain or branched-chain alkyl radicals. Examples of quaternary ammonium compound A include hydroxymethyltrimethylammonium hydroxide, hydroxymethyltriethylammonium hydroxide, (2-hydroxyethyl)triethylammonium hydroxide and (3-hydroxypropyl)trimethylammonium hydroxide.

In general formula [1] it is preferable that $R^1$, $R^2$ and $R^3$ be the same or different hydrocarbon radicals with 1-3 carbon atoms, and that n be an integer between 1 and 4. With such a low molecular weight, quaternary ammonium compound A is highly soluble in water, enhancing the effect of the present invention in preventing corrosion even when small quantities are added. (β-hydroxyethyl)trimethylammonium hydroxide (choline), which has methyl radicals for $R^1$, $R^2$ and $R^3$ and an n of 2, is particularly preferable as quaternary ammonium compound A.

The metal corrosion inhibitor of the present invention can be composed entirely of quaternary ammonium compound A, but may also contain ammonia, neutralizing amines and other corrosion inhibitors, hydrazine, sodium sulfite, sugars and other oxygen scavengers and the like in addition of quaternary ammonium compound A.

There are no particular limits on the content of quaternary ammonium compound A in the metal corrosion inhibitor of the present invention so long as the effect of the present invention is achieved to prevent corrosion even when small quantities are added. A content of 1-100% by mass is normal, and 5-50% by mass is preferable.

Examples of unit metals of which corrosion is to be prevented by the metal corrosion inhibitor of the present invention include for example iron, iron alloys, copper, copper alloys, aluminized steel and the like, but the present invention is not limited by these. The metal corrosion inhibitor of the present invention can prevent corrosion of unit metals in steam generating units and petroleum refining and petrochemical process by methods such as those described below.

[Method of Inhibiting Corrosion in a Steam Generating Unit]

In the present invention, corrosion in a steam generating unit is inhibited through the use of quaternary ammonium compound A or the metal corrosion inhibitor of the present invention described above. The steam generating unit which is to be protected from corrosion is a unit which is capable of generating steam, such as a general boiler, the waste heat boiler of a petrochemical plant, gas turbine facility or the like, or the steam generator of a pressurized water reactor or the like, and which is liable to corrosion of the metal of the unit. The boiler may be a cylindrical boiler, water tube boiler, once-through boiler, cast-iron boiler or special boiler (indirect heating boiler, waste heat boiler, special fuel boiler, special fluid boiler or the like).

The metal corrosion inhibitor or quaternary ammonium compound A of the present invention is added to water which may contact the inside of the steam generating unit, and undergoes a neutralizing reaction with acids in the water. For example, as shown in FIG. 1, if the steam generating unit is a boiler there are three water systems (the feed water system, the inside of the boiler and the vapor/condensed water system), and the metal corrosion inhibitor or quaternary ammonium compound A of the present invention can be added to any one or more than one of these water systems. However, because neutralization is more widespread if the metal corrosion inhibitor or quaternary ammonium compound A of the present invention is added further upstream, it is generally preferable to add it to the feed water system.

The method for adding the metal corrosion inhibitor or quaternary ammonium compound A of the present invention to the water system (injection method) may be continuous injection or intermittent injection. In the case of continuous injection, either quantified injection or flow rate proportional injection may be used, while in the case of intermittent injection, either suction injection or forcing injection may be used.

The quantity of the metal corrosion inhibitor or quaternary ammonium compound A of the present invention added to the water system will differ depending on pressures of boiler, processing methods and the like and cannot be decided definitely, but should be in the range of 0.1-50 mg/L or more preferably 0.2-10 mg/L with respect to the feed water. Practically, it can be controlled as necessary to meet required standards of water quality: for example, the pH of boiler water with a maximum use pressure of 10.0 MPa and with a volatile treatment should be controlled to 8.5-9.5, in which case the quantity of the metal corrosion inhibitor or quaternary ammonium compound A of the present invention added should be 0.4-4 mg/L with respect to the feed water.

Because quaternary ammonium compound A has a high degree of dissociation and is strongly neutralizing in comparison with the ammonia and neutralizing amines used as conventional pH controllers, and it is also likely to remain in the boiler due to its relatively low volatility, it can efficiently prevent corrosion even when added in small quantities. Consequently, by adding the metal corrosion inhibitor or quaternary ammonium compound A of the present invention to a water system, especially to a feed water system, it is possible to efficiently neutralize and prevent corrosion in the feed water, the boiler and the vapor/condensed water system.

In particular, in boilers in which non-volatile alkalis such as caustic soda cannot be used or can only be used in limited quantities for structural or process reasons (for example the waste heat boilers of petrochemical plants), amines have conventionally been used in large quantities to control pH, but using the metal corrosion inhibitor or quaternary ammonium compound A of the present invention as a pH controller in such steam generating units, adequate corrosion prevention can be achieved with the addition of only small quantities.

Moreover, because quaternary ammonium compound A is strongly basic, it can maintain a higher pH than conventional amine salts even when amine carbonates produced by neutralization become dissolved in water. That is, with the present invention it is possible to effectively prevent secondary corrosion caused by neutralized salts.

[A Method for Preventing Corrosion of Metal in Petroleum Refining and Petrochemical Process Units]

In the present invention, corrosion of metal in a petroleum refining process unit or petrochemical process unit is prevented through the use of the aforementioned metal corrosion inhibitor or quaternary ammonium compound A of the present invention. In petrochemical process, corrosion of the metal of units is especially likely to occur in the BTX refining process, ethylene manufacturing process, styrene monomer manufacturing process and the like. Examples of units to be protected from corrosion including units liable to corrosion by acids, such as the atmospheric distillation column and fractionating column and their attached connecting pipes, condensers, heat exchangers, receiving tanks and other units.

The metal corrosion inhibitor or quaternary ammonium compound A of the present invention is contained in fluids (oil, water, other liquids or gases) which may contact the inside of the petroleum refining or petrochemical process unit, and undergoes a neutralizing reaction with acids in the fluid. For example, to protect a fractionating column (or atmospheric distillation column) from corrosion, it can be added either through the side reflux line or directly into the column, or else into the feed line of the column. When controlling pH within the overhead condenser of a column, it should be added to the ejection pipe at the top of the column.

The method for adding the metal corrosion inhibitor or quaternary ammonium compound A of the present invention to a fluid (injection methods) may be continuous injection or intermittent injection. In the case of continuous injection, either quantified injection or flow rate proportional injection may be used.

The quantity of the metal corrosion inhibitor or quaternary ammonium compound A of the present invention added to the fluid may be controlled appropriately such that the pH in the system is within a range which is unlikely to cause corrosion of metal of the unit. For example in the top line of a crude oil atmospheric distillation column, it should be controlled to achieve a pH of 5.5-6.5 within the system.

Because quaternary ammonium compound A is more strongly basic than ammonia and neutralizing amines as the conventional pH controllers, it can effectively prevent corrosion even when added in small quantities. Consequently, by adding the metal corrosion inhibitor or quaternary ammonium compound A of the present invention to fluid which may contact the inside of a petroleum refining or petrochemical process unit, it is possible to efficiently prevent corrosion of metals of the unit.

In the atmospheric distillation column which is the most important unit in petroleum refining and petrochemical process, especially in petroleum refining process, conventionally it has been necessary to use neutralizing amines to neutralize hydrogen chloride derived from crude oil elements in order to prevent corrosion of metals in this unit, but neutralization produces amine hydrochlorides. Such amine hydrochlorides are highly hygroscopic, and some dissolve as they absorb water within the system. Such an aqueous solution in which amine hydrochlorides are dissolving normally has a low pH, and may cause secondary corrosion within the system. In the case of the present invention, however, because quaternary ammonium compound A is extremely basic, hydrochlorides of quaternary ammonium compound A do not lower pH dramatically even when dissolved in water. That is, secondary corrosion can be restrained with quaternary ammonium compound A because it is less corrosive than hydrochlorides of the ammonia, alkanolamines, methoxypropylzmine and the like conventionally used as pH controllers. In particular, in systems such as atmospheric distillation columns and fractionating columns in which hydrochlorides produced by neutralization accumulate, greater corrosion prevention effects can be achieved with the present invention.

[Hydrogen Chloride Formation Inhibitor]

The hydrogen chloride formation inhibitor for a crude oil atmospheric distillation unit of the present invention comprises (β-hydroxyethyl)trimethylammonium hydroxide (hereunder called "choline"). It is preferable to use this hydrogen chloride formation inhibitor in the form of an aqueous solution of choline. In this case, choline should be contained in the hydrogen chloride formation inhibitor in the amount of about 5-100% by mass or preferably about 20-50% by mass.

If used according to the methods described below, the hydrogen chloride formation inhibitor of the present invention can prevent formation of hydrogen chloride and protect a crude oil atmospheric distillation unit from corrosion. When using the hydrogen chloride formation inhibitor of the present invention, alkaline chemicals such as sodium hydroxide can also be used in combination.

[Hydrogen Chloride Formation Inhibiting Method]

In the present invention, hydrogen chloride formation is inhibited and corrosion of unit metal is prevented in a crude oil atmospheric distillation unit through the use of choline or the aforementioned hydrogen chloride formation inhibitor (both referred to hereunder as "the hydrogen chloride formation inhibitor.")

The hydrogen chloride formation inhibitor is preferably contained in the desalted crude oil between the crude oil desaltor and main distillation column of the crude oil atmospheric distillation unit, and more specifically it is preferably added to the desalted crude oil at the outlet of the crude oil desaltor. The hydrogen chloride formation inhibitor is preferably added to the desalted crude oil being controlled such that the choline content of the hydrogen chloride formation inhibitor is 0.1-5 times or preferably 1-2 times by molar equivalent the salts content of magnesium chloride, calcium chloride and other salts in the desalted crude oil.

Continuous injection is the preferable method for adding the hydrogen chloride formation inhibitor (injection method), and in particular it is preferable to inject continuously while controlling the content of the hydrogen chloride formation inhibitor according to the salts content of the desalted crude oil. In this case, it is preferable to measure the chloride ion concentration or pH of the top line or overhead system of the main distillation column, and to measure the chloride ion concentration or pH of the overhead receiver water of the main distillation column in particular, and to appropriately control the quantity of hydrogen chloride formation inhibitor to be added based on the measurement results. The salts content of desalted crude oil fluctuates, but it is possible to appropriately control the quantity of hydrogen chloride formation inhibitor to be added by measuring the chloride ion concentration or pH of the top line of the main distillation column in the above way.

Specifically, it is preferable that the quantity of hydrogen chloride formation inhibitor to be added be controlled such that the chloride ion concentration (sodium chloride conversion) of the overhead receiver water is 0-30 mg/L or more preferably 0-10 mg/L, or the pH of the overhead receiver water is 5.5-7.0 or more preferably 5.5-6.5.

Because the choline in the hydrogen chloride formation inhibitor has a high degree of dissociation and is strongly basic, it reacts with salts such as magnesium chloride, calcium chloride and the like in the desalted crude oil to produce choline chlorides, as shown by the following chemical formula:

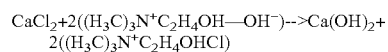

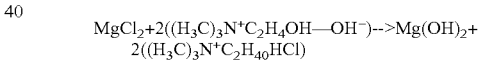

Consequently, by adding the hydrogen chloride formation inhibitor to desalted crude oil as described above, it is possible to prevent formation of the hydrogen chloride itself and corrosion of metal of the unit due to hydrogen chloride. Because the choline in the hydrogen chloride formation inhibitor does not contain any metals which might adversely affect catalyst in the heavy oil direct desulfurization unit or the like, deterioration of the catalyst will not result even if the hydrogen chloride formation inhibitor is added in excess.

The choline chlorides produced in this way will be decomposed by heating as shown in the following formula, but the main decomposition products will be methyl chloride and amines such as trimethylamine and N,N-dimethylaminoethanol, with almost no hydrogen chloride produced.

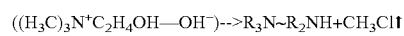

Moreover, while hydrochlorides of the alkanolamines normally used as neutralizers cause secondary corrosion because they are highly hygroscopic, and absorb water inside the system, dissolve and lower pH, choline chlorides are more fluid than hydrochlorides of alkanolamines, and have extremely low metal corrosiveness, so they do not cause problems such as corrosion of the unit metal or line blockage.

Figure 2:
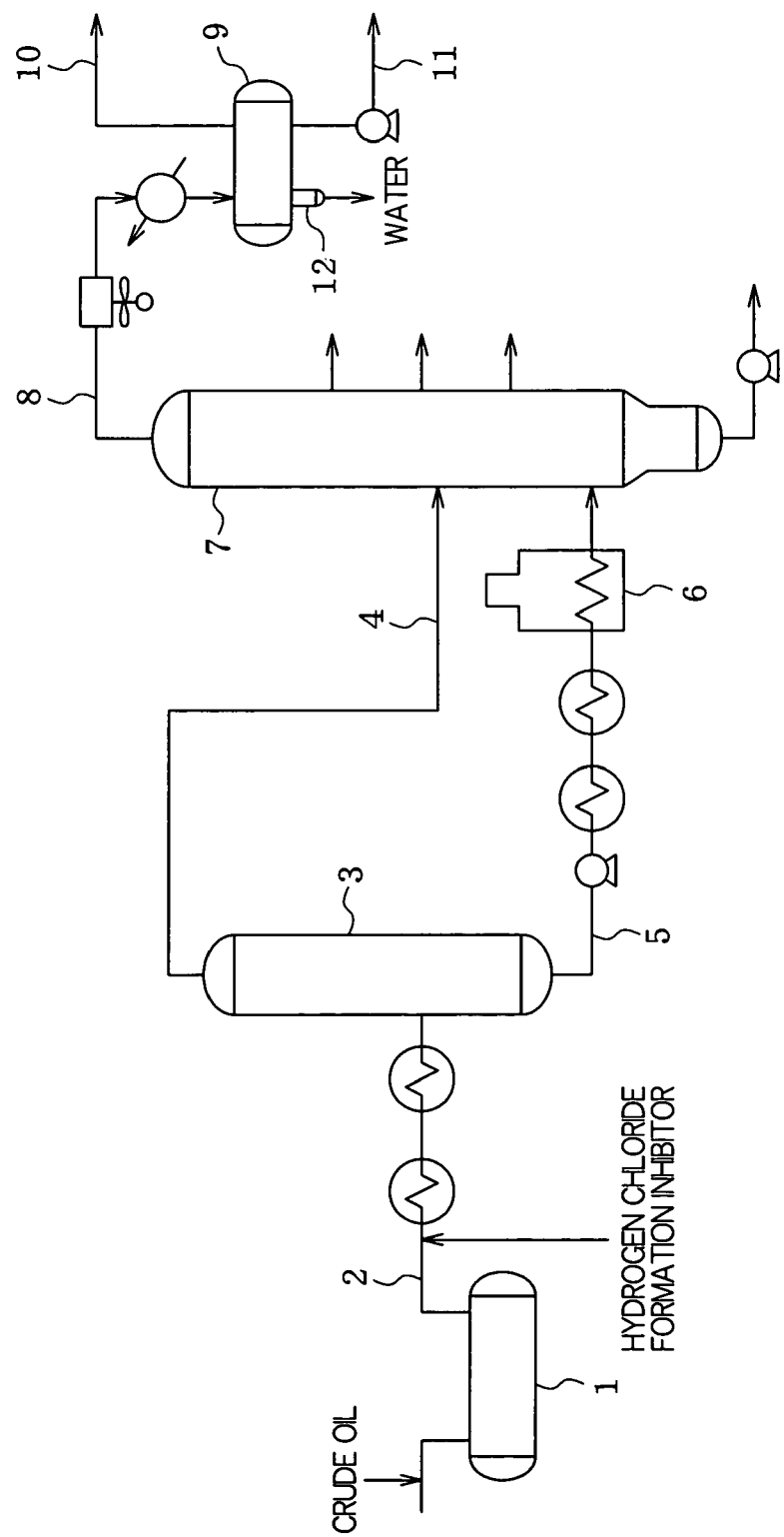
FIG. 2 is a process drawing of one example of a crude oil atmospheric distillation method (2-columns type)

One embodiment of the method for inhibiting formation of hydrogen chloride of the present invention is explained here with reference to the process drawing of a crude oil atmospheric distillation method (2-columns type) shown in FIG. 2.

Crude oil is supplied continuously to crude oil desaltor 1, where it is desalted and dehydrated and solid matter is removed. Desalted crude oil exiting crude oil desaltor 1 is fed to pre-distillation column 3 through line 2, while the hydrogen chloride formation inhibitor is added to line 2 at the outlet of crude oil desaltor 1 and converts magnesium chloride and calcium chloride to choline chlorides. Desalted crude oil to which the hydrogen chloride formation inhibitor has been added is fed to pre-distillation column 3 through line 2, and evaporated water and light oil from the pre-distillation column 3 are supplied to main distillation column 7 through line 4.

Residue from pre-distillation column 3 is fed to furnace 6 through line 5, heated to a prescribed temperature, then fed to main distillation column 7, where it is fractionated into its various fractions (naphtha and kerosene, heavy kerosene, light gas oil, heavy gas oil and residue). At this point, the partial magnesium chloride and calcium chloride remaining is hydrolyzed and may produce hydrogen chloride, but the resulting hydrogen chloride is captured as choline chloride by unreacted choline.

Naphtha and kerosene from the top of main distillation column 7 are condensed through line 8, and collected in naphtha/kerosene receiving tank 9 (an example of an overhead receiver). Gases and liquids are separated in this naphtha/kerosene receiving tank 9, and the fuel gas or LPG as the gas fraction is removed through line 10, while the naphtha and kerosene as the liquid fraction are removed through line 11. The water (overhead receiver water) which accumulates at the bottom of naphtha/kerosene receiving tank 9 is drained through drain 12 of naphtha/kerosene receiving tank 9.

The chloride ion concentration or pH of the overhead receiver water drained from naphtha/kerosene receiving tank 9 is measured. Based on the measurement results, the quantity of hydrogen chloride formation inhibitor added to line 2 at the outlet of crude oil desaltor 1 is controlled appropriately. The measurement of chloride ion concentration or pH and the control of quantity of hydrogen chloride formation inhibitor to be added can be automated as a sequential system.

The crude oil atmospheric distillation method described above uses an example of a 2-columns type, but the present invention is not limited thereby, and formation of hydrogen chloride can also be prevented by methods similar to those described above with a crude oil atmospheric distillation method using a different example of a 2-columns type, or with a crude oil atmospheric distillation method using a 1-column type.

EXAMPLES

The present invention is explained in more detail below with reference to examples, but the scope of the present invention is not limited by these or any other examples.

Example 1

[Neutralizing Capability]

The pH values of ($\beta$-hydroxyethyl)trimethylammonium hydroxide (choline), monoethanolamine, ammonia, cyclohexylamine and morpholine were measured using a pH meter (manufactured by Horiba, product name pH Meter F-21), and the respective base dissociation constants (Kb value, 25° C.) were calculated. These base dissociation constants are an indicator of neutralizing capability, with a larger number indicating that the substance has a higher degree of dissociation and is more strongly basic. The results are shown in Table 1.

TABLE 1

|  | Kb value (25° C.) |
|---|---|
| Choline | $3.14 \times 10^{-3}$ |
| Monoethanolamine | $3.15 \times 10^{-5}$ |
| Ammonia | $1.82 \times 10^{-5}$ |
| Cyclohexylamine | $3.39 \times 10^{-4}$ |
| Morpholine | $2.09 \times 10^{-6}$ |

It is understood from Table 1 that since ($\beta$-hydroxyethyl)trimethylammonium hydroxide has a larger base dissociation constant than the ammonia and amines, it is more strongly basic.

Next, the quantity of added ammonia or amines necessary to achieve a pH of 10.0, 10.5 or 11.0 in the boiler water was measured. A test boiler with evaporation of 5 L/h was used as the boiler, operating under conditions of temperature of 170° C., pressure of 0.8 Mpa, feed water was pure water, concentration rate of 100, blow rate of 1% and steam recovery rate of 0%, and pH was controlled by volatile treatment.

The results are shown in Table 2. The values in Table 2 are expressed as ratios (mass ratios) with the value for ($\beta$-hydroxyethyl)trimethylammonium hydroxide given as 1.

TABLE 2

|  | Boiler water pH (25° C.) | | |
|---|---|---|---|
|  | 10.0 | 10.5 | 11.0 |
| Choline | 1.0 | 1.0 | 1.0 |
| Monoethanolamine | 1.8 | 6.3 | 11.3 |
| Ammonia | 7.8 | 21.1 | 49.9 |
| Cyclohexylamine | 20.3 | 28.0 | 44.8 |
| Morpholine | 53.0 | 159.1 | 424.2 |

It is understood from Table 2 that ($\beta$-hydroxyethyl)trimethylammonium hydroxide can neutralize the boiler water efficiently with smaller quantities than the ammonia and amines.

Example 2

[Corrosiveness of Hydrochlorides]

The following corrosion test was performed to evaluate the corrosiveness of hydrochlorides of ammonia or amines (($\beta$-hydroxyethyl)trimethylammonium hydroxide, ammonia, monoethanolamine, 3-methoxypropylamine and dimethylethanolamine).

In the corrosion test, the hydrochlorides of the aforementioned ammonia and amines were poured into glass beakers at concentrations of 50% by mass (hydrochloride:pure water=1:1), and test pieces (50×15×1 mm, sanded with #400 sandpaper, degreased with toluene) of carbon steel (SPCC) were immersed in the beakers for 20 hours at 50° C. under argon deaeration (anoxic conditions). The test pieces were derusted after testing, and corrosion speed (mg/dm$^2$/day) was calculated from the difference in mass before and after testing. The results are shown in Table 3.

TABLE 3

| Kind of ammonia or amines | Corrosion speed (mdd) |
|---|---|
| Choline | 32 |
| Ammonia | 256 |
| Monoethanolamine | 132 |
| 3-methoxypropylamine | 480 |
| Dimethylethanolamine | 288 |

It is understood from Table 3 that the hydrochloride of (β-hydroxyethyl)trimethylammonium hydroxide has a much lower corrosion speed than the ammonia and other amines.

Test Example 1

[Distillation Test]

Aqueous solutions containing magnesium chloride and basic material (choline, sodium hydroxide, monoethanolamine, dimethylethanolamine) at a mole ratio of 1:2 and an aqueous solution containing magnesium chloride alone without any basic material were prepared and used as test solutions 1-5. The compositions of the test solutions (TS) are shown in Table 4.

TABLE 4

| | Salt | | Base | |
|---|---|---|---|---|
| | Compound | Content | Compound | Content |
| TS1 | Magnesium chloride | 952 mg/L, 0.01 mol/L (710 mg/L as chlorine) | Choline | 2,420 mg/L, 0.02 mol/L |
| TS2 | Magnesium chloride | 952 mg/L, 0.01 mol/L (710 mg/L as chlorine) | Sodium hydroxide | 800 mg/L, 0.02 mol/L |
| TS3 | Magnesium chloride | 952 mg/L, 0.01 mol/L (710 mg/L as chlorine) | Monoethanolamine | 1,222 mg/L, 0.02 mol/L |
| TS4 | Magnesium chloride | 952 mg/L, 0.01 mol/L (710 mg/L as chlorine) | Dimethylethanolamine | 1,782 mg/L, 0.02 mol/L |
| TS5 | Magnesium chloride | 952 mg/L, 0.01 mol/L (710 mg/L as chlorine) | — | — |

In the test solutions above, guaranteed anhydrous magnesium chloride was used as the magnesium chloride, and industrial 48% sodium hydroxide as the sodium hydroxide.

Using the distillation method of JIS K2275 (Method for testing water content of crude oil and petroleum products), the test solutions above were added to gas oil (commercial fuel) in amounts of 5% by mass and distilled for 0.5 hours at 100° C. to maximum 200° C., and the chloride ion concentration in the distillate was measured. The results are shown in Table 5.

TABLE 5

| | Base | Chloride ion concentration (mg/L) |
|---|---|---|
| TS1 | Choline | 2.8 |
| TS2 | Sodium hydroxide | 5.4 |
| TS3 | Monoethanolamine | 140 |
| TS4 | Dimethylethanolamine | 140 |
| TS5 | — | 110 |

It is understood from Table 5 that choline exhibits a hydrogen chloride formation inhibiting effect or hydrogen chloride neutralizing effect equivalent to or greater than that of sodium hydroxide with respect to formation of hydrogen chloride derived from magnesium chloride (with test solution 5 which contains no basic material as the blank). On the other hand, neither monoethanolamine nor dimethylethanolamine exhibited any hydrogen chloride formation inhibiting effect or hydrogen chloride neutralizing effect.

Test Example 2

[Base Dissociation Constant]

The pH values of choline, monoethanolamine and dimethylethanolamine were measured using a pH meter (manufactured by Horiba, product name pH Meter F-21), and the respective base dissociation constants (Kb value, 25° C. and 170° C.) were calculated. These base dissociation constants are an indicator of neutralizing capability, with a larger number indicating that the substance has a higher degree of dissociation and is more strongly basic. The results are shown in Table 6.

TABLE 6

| | Kb (25° C.) | Kb (170° C.) |
|---|---|---|
| Choline | $3.14 \times 10^{-3}$ | $8.40 \times 10^{-3}$ |
| Monoethanolamine | $2.60 \times 10^{-5}$ | $8.42 \times 10^{-6}$ |
| Dimethylethanolamine | $2.21 \times 10^{-5}$ | $3.38 \times 10^{-5}$ |

It is understood from Table 6 that choline has a greater base dissociation constant than alkanolamines generally used as neutralizers, and is more strongly basic.

Test Example 3

[Corrosiveness Test]

Aqueous solutions of choline chloride, monoethanolamine hydrochloride and dimethylethanolamine in an amount of 50% by mass were prepared and used as the test solutions. The test solutions were poured into glass beakers, and test pieces (50×15×1 mm, sanded with #400 sandpaper, degreased with toluene) of mild steel were immersed in the beakers for 18 hours at 90° C. under nitrogen deaeration (anoxic conditions). The test pieces were derusted after testing, and corrosion speed (mg/dm$^2$/day) was calculated from the difference in mass before and after testing. The results are shown in Table 7.

TABLE 7

| | Corrosion speed (mdd) |
|---|---|
| Choline hydrochloride (choline chloride) | 32 |
| Monoethanolamine hydrochloride | 132 |
| Dimethylethanolamine hydrochloride | 288 |

It is understood from Table 7 that choline chloride has a much lower corrosion speed than chlorides of alkanolamines generally used as neutralizers, and consequently its corrosiveness is extremely low.

Test Example 4

[Thermal Decomposition of Choline Chloride]

Choline chloride was subjected to thermal decomposition GC/MS analysis. 5989A manufactured by Hewlett Packard was used as the GC/MS analyzer, and DB624 manufactured by J&W (0.32 mm×30 m, membrane thickness of 1.8 μm) was used as the column. The temperature for thermal decomposition of choline chloride was 760° C. A chart of the analysis results is given in FIG. 3.

Figure 3:
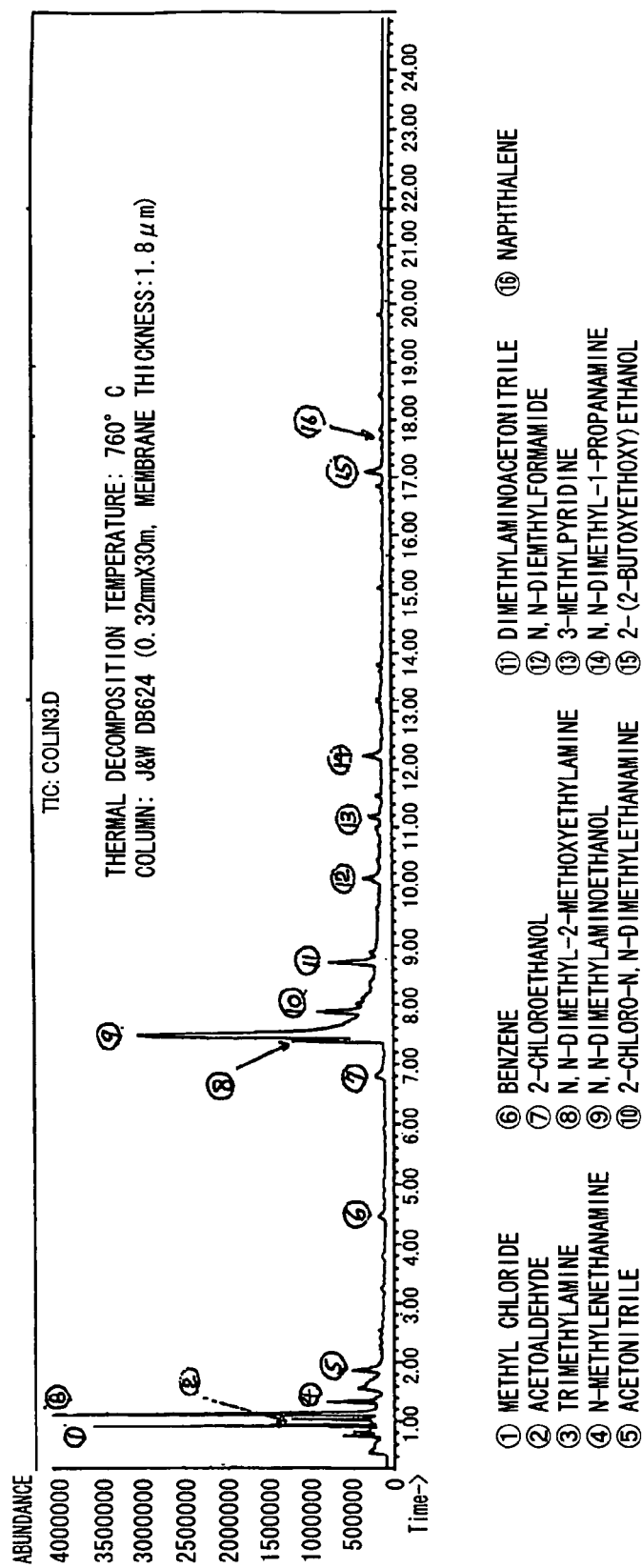
FIG. 3 shows a chart of the GC/MS measurement results for thermal decomposition of choline chloride.

As shown by the chart in FIG. 3, choline chloride produces methyl chloride, trimethylamine and N,N-dimethylaminoethanol by thermal decomposition, but does not produce hydrogen chloride.

INDUSTRIAL APPLICABILITY

The metal corrosion inhibitor of the present invention can adequately prevent corrosion of metal in a steam generating unit or petroleum refining or petrochemical process unit even when added in small quantities, and can reduce the risk of secondary corrosion because the neutralized salts produced do not dramatically lower pH when dissolved in water.

Moreover, with the method for preventing corrosion of metal of the present invention, corrosion of metal in a steam generating unit or petroleum refining or petrochemical process unit can be adequately prevented when the quantity of chemical added is small, and the risk of secondary corrosion can be reduced because the resulting neutralized salts do not dramatically lower pH even when dissolved in water.

In other words, the metal corrosion inhibitor and method for preventing corrosion of metal of the present invention are useful for inhibiting metal corrosion in steam generating units and petroleum refining and petrochemical process units.

In addition, with the hydrogen chloride formation inhibitor and method for inhibiting formation of hydrogen chloride of the present invention it is possible in a crude oil atmospheric distillation unit to prevent corrosion of the metal of the unit due to hydrogen chloride by inhibiting the formation of the hydrogen chloride itself. Moreover, the hydrogen chloride formation inhibitor and method for inhibiting formation of hydrogen chloride of the present invention do not adversely affect the catalyst in the heavy oil direct desulfurization unit, and there is no risk of metal corrosion or line blockage from salts produced by the hydrogen chloride formation inhibitor or method for inhibiting formation of hydrogen chloride of the present invention.

In other words, the hydrogen chloride formation inhibitor and method for inhibiting formation of hydrogen chloride of the present invention are useful in preventing the formation of hydrogen chloride in crude oil atmospheric distillation units.

The invention claimed is:

1. A method for preventing corrosion of metal in an atmospheric distillation column for petroleum refining process, comprising:
    preparing (β-hydroxyethyl) trimethylammonium hydroxide, and
    adding only the (β-hydroxyethyl) trimethylammonium hydroxide to fluid containing water and substantially no NaOH for preventing corrosion of metal, the fluid contacting an inside of the atmospheric distillation column for petroleum refining process, the amount of (β-hydroxyethyl) trimethylammonium hydroxide being adjusted to maintain a pH value thereof at a top line of the atmospheric distillation column at 5.5-6.5.

2. A method for inhibiting formation of hydrogen chloride in a crude oil atmospheric distillation unit, comprising:
    preparing (β-hydroxyethyl) trimethylammonium hydroxide; and
    adding only the (β-hydroxyethyl) trimethylammonium hydroxide to desalted crude oil containing substantially no NaOH in between a crude oil desalter and a main distillation column in the crude oil atmospheric distillation unit.

3. The method for inhibiting formation of hydrogen chloride in a crude oil atmospheric distillation unit according to claim 2, wherein the (β-hydroxyethyl) trimethylammonium hydroxide content is controlled to 0.1-5 times by molar equivalent the salts content in the desalted crude oil.

4. The method for inhibiting formation of hydrogen chloride in a crude oil atmospheric distillation unit according to claim 2, wherein the chloride ion concentration or pH of the condensed water in the main distillation unit is measured, and the (β-hydroxyethyl) trimethylammonium hydroxide content is controlled based on the measurement results.

5. The method for inhibiting formation of hydrogen chloride in a crude oil atmospheric distillation unit according to claim 2, wherein the (β-hydroxyethyl) trimethylammonium hydroxide content is controlled such that the chloride ion concentration (sodium chloride conversion) of the overhead receiver water is 0-30 mg/L or the pH of the overhead receiver water is 5.5-7.0.

* * * * *